(12) United States Patent
Terada et al.

(10) Patent No.: US 7,223,493 B2
(45) Date of Patent: May 29, 2007

(54) SUPPORTED CATALYST FOR FUEL CELL, METHOD OF MANUFACTURING THE SAME, AND FUEL CELL

(75) Inventors: Tomoaki Terada, Kakegawa (JP); Toshiharu Tabata, Kakegawa (JP); Hiroaki Takahashi, Toyota (JP)

(73) Assignees: Cataler Corporation, Kakegawa-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 11/244,459

(22) Filed: Oct. 5, 2005

(65) Prior Publication Data

US 2006/0051657 A1   Mar. 9, 2006

Related U.S. Application Data

(63) Continuation of application No. PCT/JP05/02265, filed on Feb. 15, 2005.

(30) Foreign Application Priority Data

Feb. 23, 2004   (JP) .............................. 2004-046349

(51) Int. Cl.
  *H01M 4/00*  (2006.01)
  *H01M 8/10*  (2006.01)
  *H01M 4/88*  (2006.01)
  *B01J 23/42*  (2006.01)

(52) U.S. Cl. ......................... 429/44; 429/30; 502/101; 502/339

(58) Field of Classification Search ................. 429/40, 429/44, 30; 501/101, 339; 502/101, 339
See application file for complete search history.

(56) References Cited

U.S. PATENT DOCUMENTS 6,911,278 B2 *   6/2005   Hiroshima et al. ............ 429/40

FOREIGN PATENT DOCUMENTS

| | | |
|---|---|---|
| JP | 6-29028 A | 2/1994 |
| JP | 6-176766 | 6/1994 |
| JP | 6-246160 A | 9/1994 |
| JP | 9-161811 A | 6/1997 |
| JP | 2001-52718 | 2/2001 |
| JP | 2001-118582 A | 4/2001 |
| JP | 2001-319661 A | 11/2001 |
| JP | 2003-45442 | 2/2003 |
| JP | 2003-92114 A | 3/2003 |
| JP | 2003-142112 A | 5/2003 |
| JP | 2003-151566 | 5/2003 |

* cited by examiner

*Primary Examiner*—Patrick Joseph Ryan
*Assistant Examiner*—Thomas H. Parsons
(74) *Attorney, Agent, or Firm*—Morrison & Foerster LLP

(57) ABSTRACT

Provided is a supported catalyst for a fuel cell, containing a conductive support and a platinum alloy supported thereby, wherein an elution ratio of transition metal other than platinum is 30% or less when 0.5 g of the supported catalyst is stirred at room temperature in 30 mL of 0.1N aqueous sulfuric acid solution for 800 hours.

11 Claims, 3 Drawing Sheets

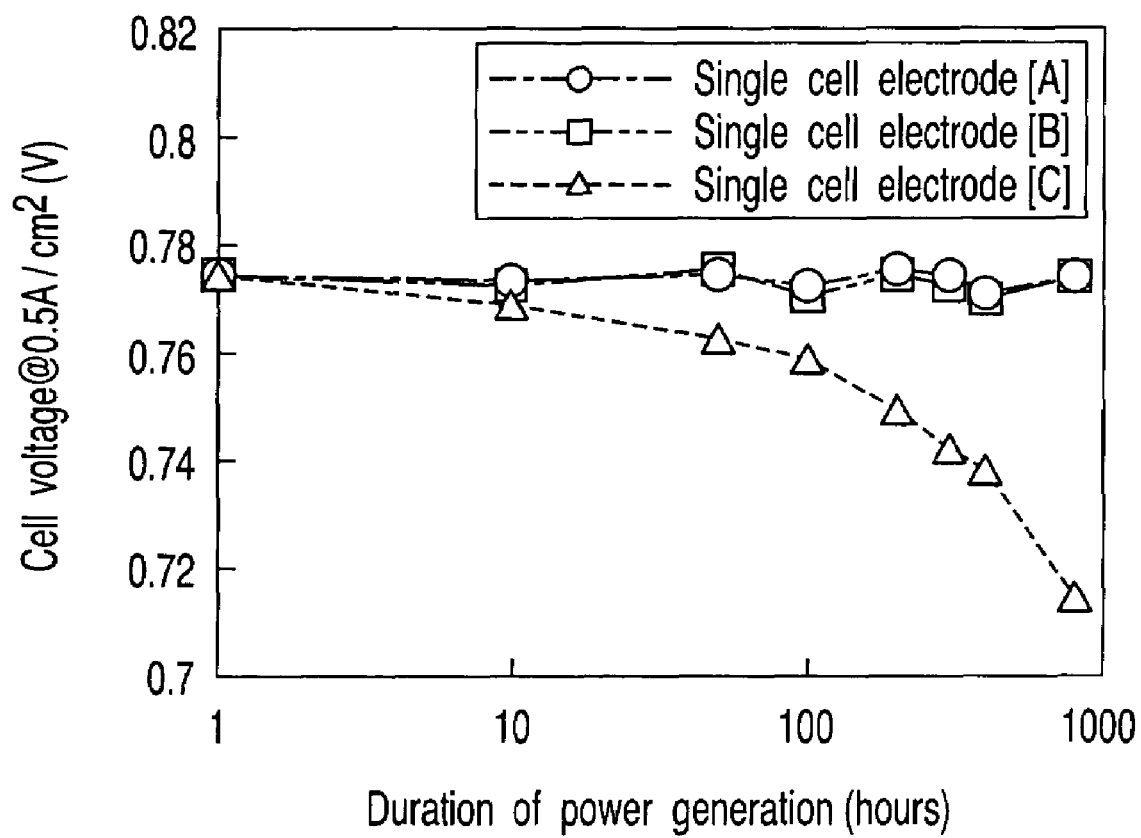
F I G. 4

US 7,223,493 B2

SUPPORTED CATALYST FOR FUEL CELL, METHOD OF MANUFACTURING THE SAME, AND FUEL CELL

CROSS REFERENCE TO RELATED APPLICATIONS

This is a Continuation Application of PCT Application No. PCT/JP2005/002265, filed Feb. 15, 2005, which was published under PCT Article 21(2) in Japanese.

This application is based upon and claims the benefit of priority from prior Japanese Patent Application No. 2004-046349, filed Feb. 23, 2004, the entire contents of which are incorporated herein by reference.

BACKGROUND OF THE INVENTION

1. Field of the Invention

The present invention relates to a supported catalyst for a fuel cell, a method of manufacturing the same, and a fuel cell and, more particularly, to a supported catalyst for a fuel cell which includes a conductive support and a platinum alloy supported thereby, a method of manufacturing the same, and a fuel cell using the same.

2. Description of the Related Art

Some platinum alloys have catalytic activity higher than that of platinum. To improve the performance of a fuel cell, therefore, it is effective to use supported catalysts each including a conductive support and a platinum alloy supported thereby. However, a fuel cell using such supported catalysts deteriorates with time more easily than a fuel cell using supported catalysts each including a conductive support and platinum supported thereby.

To solve this problem, it is being attempted to suppress the deterioration of a fuel cell with time by improving the durability of the supported catalysts.

For example, Jpn. Pat. Appln. KOKAI Publication No. 6-176766 describes a method by which platinum, nickel, and cobalt are supported by conductive supports, and thereafter, platinum is alloyed with nickel and cobalt by heating at a temperature equal to or higher than 600° C. and lower than 800° C. to produce a regular structure in the platinum-nickel-cobalt ternary alloy. Also, Jpn. Pat. Appln. KOKAI Publication No. 2001-52718 describes a method which includes causing carbon supports to support platinum so as to produce supported platinum catalysts, adding a base metal to the supported platinum catalysts to produce supported alloy catalysts, partially removing the base metal from the supported alloy catalysts by elution, bringing the supported alloy catalysts into contact with carbon monoxide, and annealing the supported alloy catalysts in an inert atmosphere. Note that in addition to these references, Jpn. Pat. Appln. KOKAI Publication Nos. 9-161811, 2003-142112, and 2003-45442 are references related to the present invention.

These methods can suppress the deterioration of a fuel cell with time to a certain degree. However, the life characteristics achieved by these methods are not necessarily satisfactory.

BRIEF SUMMARY OF THE INVENTION

An object of the present invention is to realize a fuel cell which uses a supported catalyst for a fuel cell including a conductive support and a platinum alloy supported thereby and has good life characteristics.

According to a first aspect of the present invention, there is provided a supported catalyst for a fuel cell, comprising a conductive support, and a platinum alloy supported by the conductive support, wherein an elution ratio of transition metal other than platinum is 30% or less when 0.5 g of the supported catalyst is stirred at room temperature in 30 mL of 0.1N aqueous sulfuric acid solution for 800 hours.

According to a second aspect of the present invention, there is provided a fuel cell comprising an anode catalyst layer, a cathode catalyst layer, and an electrolyte layer interposed therebetween, wherein at least one of the anode and cathode catalyst layers contains the supported catalyst according to the first aspect.

According to a third aspect of the present invention, there is provided a method of manufacturing a supported catalyst for a fuel cell, comprising causing a particulate conductive support to support a platinum compound, applying a reducer to the platinum compound to metallize the platinum compound, after metallizing the platinum compound, causing the conductive support to further support a transition metal other than platinum by wet process under reducing condition, producing an alloy of the platinum and the transition metal other than platinum by heating the conductive support supporting the transition metal other than platinum to obtain a supported catalyst comprising the conductive support and the alloy supported thereby, and acid washing the supported catalyst to remove an unalloyed component of the transition metal other than platinum from the supported catalyst.

BRIEF DESCRIPTION OF THE SEVERAL VIEWS OF THE DRAWING

FIG. 4 is a graph showing changes in output voltage with time.

DETAILED DESCRIPTION OF THE INVENTION

Figure 1:
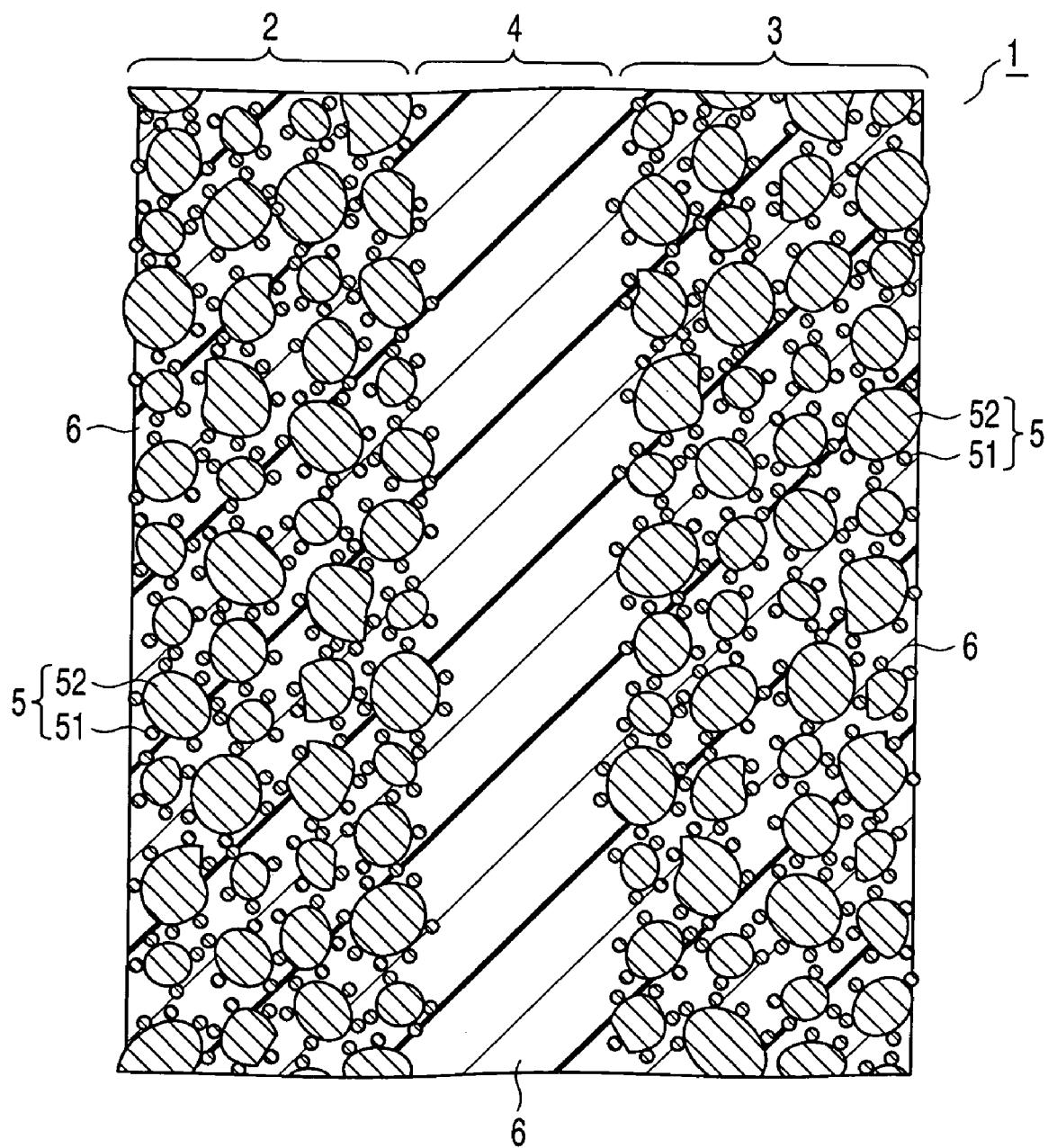
FIG. 1 is a sectional view schematically showing a structure usable in a fuel cell according to an embodiment of the present invention.

An embodiment of the present invention will be explained in detail below with reference to the accompanying drawing. Note that the same reference numerals denote the same or similar components in the drawing, and a repetitive explanation thereof will be omitted.

FIG. 1 is a sectional view schematically showing a structure usable in a fuel cell according to an embodiment of the present invention. FIG. 1 shows a membrane electrode assembly for a polymer electrolyte fuel cell as an example.

The membrane electrode assembly 1 includes an anode catalyst layer 2, a cathode catalyst layer 3, and a proton conductive solid electrolyte layer 4 interposed between them and containing a proton conductive solid electrolyte.

The anode catalyst layer 2 and cathode catalyst layer 3 contain supported catalysts 5 each including a platinum catalyst 51 supported by a conductive support 52 such as a carbon support, and a proton conductive solid electrolyte 6. The proton conductive solid electrolyte layer 4 contains the proton conductive solid electrolyte 6.

At least one of the anode catalyst layer 2 and cathode catalyst layer 3 contains supported catalysts 5 which use a platinum alloy as the platinum catalyst 51. Assume, for example, that both the anode catalyst layer 2 and cathode catalyst layer 3 contain the supported catalysts 5 which use a platinum alloy as the platinum catalyst 51, and the whole of the supported catalysts 5 use a platinum alloy as the platinum catalyst 51.

Conventionally, it is presumed that a fuel cell using supported catalysts each including a conductive support and a platinum alloy supported thereby readily deteriorates with time mainly because the supported catalysts easily decrease the catalytic activity. The present inventors made extensive studies on this matter, and have found that elution of transition metal ions from the platinum alloy into an electrolyte has a larger effect on the deterioration with time than the decrease in catalytic activity has. That is, to suppress the deterioration of a fuel cell with time, it is important to suppress the deterioration of the electrolyte due to the elution of the transition metal ions.

The present inventors further made extensive studies, and have found that the elution ratio of transition metal is low in a supported catalyst manufactured by a method to be described later, and that this supported catalyst whose elution ratio of transition metal is low can realize a fuel cell having good life characteristics, thereby achieving the present invention. Note that the "elution ratio of transition metal" can be measured by the following evaluation method.

First, a portion of supported catalysts each including a conductive support and a platinum alloy supported thereby is used to obtain a ratio of transition metal other than platinum with respect to the supported catalyst, i.e., a supported transition metal content, P (wt %). On the other hand, 0.5 g is weighed from the rest of the supported catalysts and dispersed in 30 mL of 0.1N aqueous sulfuric acid solution, and the dispersion is stirred at room temperature for a predetermined time. After that, the dispersion is filtered under reduced pressure, and a volume $V_T$ (mL) of the filtrate is measured. In addition, this filtrate is analyzed by atomic absorption spectroscopy to measure the concentration of the transition metal other than platinum in the filtrate, i.e., an eluted transition metal concentration, $C_T$ (ppm). Note that the suffix of these abbreviations means a duration T (hours) of stirring the aqueous nitric acid solution in which the supported catalysts are dispersed.

An elution ratio $R_T$ (%) of the transition metal is the ratio of the amount of transition metal other than platinum contained in the filtrate with respect to the amount of transition metal other than platinum contained in the supported catalyst before it is treated by the aqueous sulfuric acid solution. The elution ratio $R_T$ can be calculated by an equation below by using the supported transition metal content P, the volume $V_T$ of the filtrate, and the eluted transition metal concentration $C_T$.

$$R_T = \frac{C_T \times 10^{-6} \times V_T}{0.5 \times P/100} \times 100 \quad (1)$$

Note that the eluted transition metal concentration $C_T$ obtained by this method is not affected by the temperature at which the dispersion is stirred as long as the temperature falls within the range of room temperature to 40° C. Note also that the eluted transition metal concentration $C_T$ obtained by this method is not affected by the speed of stirring the dispersion as long as the speed falls within the range over which the supported catalyst does not sediment.

In this embodiment, it is possible to use, e.g., a material manufactured by the following method as the supported catalysts 5.

First, a platinum compound is supported by particulate conductive supports 52 by a wet process. For example, the conductive supports 52 such as carbon supports are well dispersed in an aqueous solution of a platinum compound such as chloroplatinic acid. After that, this dispersion is filtered, and the filter cake is washed with deionized water or the like.

Then, a reducer is allowed to act on the platinum compound supported by the conductive supports 52, thereby metallizing the compound into platinum. For example, the washed filter cake is redispersed in deionized water, and a reducer such as sodium borohydride is added to the dispersion. After that, the dispersion is filtered, and the filter cake is washed.

Then, a transition metal other than platinum is further supported by the conductive supports 52 by a wet process under reducing conditions. For example, the filter cake after reduction and washing is put into an aqueous solution of an iron compound such as iron chloride to well disperse the conductive supports 52 supporting platinum in the solution. A reducer such as hydrazine is slowly dropped into this dispersion. In this manner, the dispersion is maintained under the reducing conditions.

In addition, the conductive supports 52 supporting the transition metal other than platinum are heated in an inert atmosphere or reducing atmosphere, thereby producing an alloy of platinum and the transition metal other than platinum. For example, the conductive supports 52 supporting the transition metal other than platinum are heated in an argon atmosphere. In this way, the supported catalysts 5 each including the platinum alloy 51 supported by the conductive support 52 are obtained.

After that, the supported catalysts 5 are washed with an acid to remove an unalloyed portion of the transition metal other than platinum from the supported catalysts 5. For example, the supported catalysts 5 are dispersed in an aqueous sulfuric acid solution, and the dispersion is well stirred. Subsequently, the dispersion is filtered, and the filter cake is washed by using deionized water or the like, and dried.

By this method, supported catalysts 5 having a transition metal elution ratio $R_{800}$ of 30% or less, typically, 20% or less are obtained. Also, the transition metal concentration $C_{800}$, which is obtained in accordance with the above evaluation method, of the supported catalysts 5 produced by this method is normally 200 ppm or less, and typically, 100 ppm or less.

Although a restraint by a theory is undesirable, the elution ratio $R_T$ of the supported catalysts 5 manufactured by the above method is low probably for the following reason.

In the above manufacturing method, after the platinum compound supported by the conductive support 52 is metallized into platinum, the transition metal other than platinum is further supported by the conductive support 52. Also, the process in which the transition metal other than platinum is supported by the conductive support 52 is carried out under reducing conditions. When this process is completed, therefore, neither the platinum compound nor a transition metal compound other than the platinum compound exists on the surfaces of platinum and the transition metal other than platinum and in the interface between them. Accordingly, no such compounds as above interfere with alloying of platinum with the transition metal other than platinum. As a consequence, a platinum compound having a uniform composition can be obtained.

If the composition of the platinum alloy is nonuniform, the corrosion resistance of the alloy against an acid becomes nonuniform. That is, a region (low-corrosion-resistance region) having an extremely low corrosion resistance against an acid is produced in the platinum alloy.

This low-corrosion-resistance region is typically a region where the content of the transition metal other than platinum is significantly high, and can be removed to some extent by acid washing. However, acid washing can remove only those portions of the low-corrosion-resistance region, which are exposed on the surface of the platinum alloy.

When the fuel cell is used, the platinum alloy is exposed to a severe environment such as a stronger acid or voltage fluctuations. Therefore, even if the low-corrosion-resistance region is partially removed by acid washing, the transition metal other than platinum elutes from the low-corrosion-resistance region which cannot be removed by acid washing, when the fuel cell is in use. For this reason, in a fuel cell using a supported catalyst having a nonuniform platinum alloy composition, an electrolyte readily deteriorates due to the elution described above, so no good life characteristics can be realized.

In contrast, the above low-corrosion-resistance region does not exist in a platinum alloy having a uniform composition. Even when the fuel cell is in use, therefore, the transition metal other than platinum does not easily elute from the platinum alloy. Accordingly, when the supported catalysts 5 manufactured by the above method are used, it is possible to suppress the deterioration of the electrolyte caused by the elution of the transition metal other than platinum, and realize good life characteristics.

The platinum alloy used as the platinum catalyst 51 need only contain platinum and at least one transition metal other than platinum. This platinum alloy is typically a binary alloy, although it may also contain three or more transition metals like a ternary alloy.

The platinum alloy used as the platinum catalyst 51 contains a transition metal which dissolves in an acid more easily than platinum. Examples of this transition metal are iron, cobalt, nickel, copper, manganese, and mixtures of these metals.

The molar ratio of the transition metal other than platinum to platinum in this platinum alloy is, e.g., 0.15 or more, and typically, 0.2 to 1.

The average particle diameter of the platinum catalysts 51 is preferably about 1 to 5 nm. When the average particle diameter of the platinum catalysts 51 is 1 nm or more, the aggregation of the catalysts can be suppressed. When the average particle diameter of the platinum catalysts 51 is 5 nm or less, the specific surface area increases, so the potential of the catalyst can be well brought out.

The supported platinum content in the supported catalysts 5 is desirably about 5 to 80 wt %, and more desirably, about 20 to 80 wt %. A supported platinum content equal to or larger than the lower limit value described above is advantageous in improving the current-voltage characteristic of the solid polymer electrolyte fuel. A supported platinum content of about 80 wt % or less is advantageous in increasing the specific surface area of the platinum catalyst 51 and is also advantageous from the viewpoint of cost.

As the conductive supports 52, it is possible to use carbon supports such as carbon black or activated carbon. The average particle diameter of the conductive supports 52 is normally about 100 nm or less.

The proton conductive solid electrolyte 6 in the anode catalyst layer 2, cathode catalyst layer 3, and proton conductive solid electrolyte layer 4 contains water. As the proton conductive solid electrolyte 6, a proton conductive solid electrolyte having an —$SO_3$— group or the like can be used. As this proton conductive solid electrolyte, it is favorable to use a perfluorosulfonic acid ionomer, e.g., Nafion, indicated by the following formula. Also, it is possible to use either the same proton conductive solid electrolyte 6 or different proton conductive solid electrolytes 6 in the anode catalyst layer 2, cathode catalyst layer 3, and proton conductive solid electrolyte layer 4 of the membrane electrode assembly 1 shown in FIG. 1.

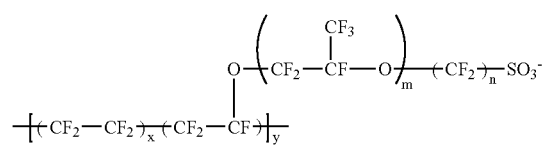

Examples of the present invention will be described below.

Preparation of Catalyst Powder [A]

Supported catalysts 5 were prepared by the following method.

First, 3.5 g of commercially available carbon black powder having a specific surface area of about 1,000 m²/g was dispersed in 0.2 L of pure water. Then, a hexahydroxo platinate nitrate solution containing 6.0 g of platinum was dropped in this dispersion. In addition, 1 L of pure water was dropped, and the dispersion was filtered.

Then, the filter cake was washed and redispersed in 1 L of pure water. Subsequently, a solution prepared by dissolving 4 g of sodium borohydride in pure water was dropped as a reducer into this dispersion, and the dispersion was filtered. By the dropping of this aqueous sodium borohydride solution, the platinum compound supported by carbon supports 52 was metallized into platinum.

Then, the filter cake was washed and redispersed in 1 L of pure water. Subsequently, an aqueous iron chloride solution containing 0.5 g of iron was added to this dispersion. In addition, hydrazine was slowly dropped in the dispersion. In this manner, the dispersion was maintained under reducing conditions and the metal iron was supported by the carbon supports 52.

The dispersion was then filtered, and the filter cake was washed and dried in a vacuum. After that, the dried filter cake was heated in an argon atmosphere at 800° C. for 2 hours to produce an alloy 51 of platinum and iron.

In addition, the carbon support 52 supporting the alloy 51 of platinum and iron was washed with 1N aqueous sulfuric acid solution to remove an unalloyed component. Subsequently, the dispersion was filtered, and the filter cake was washed and dried.

In this way, a supported catalyst 5 having a supported platinum content of 61.2 wt % and a supported iron content of 4.1 wt % was obtained. The supported catalyst 5 thus obtained will be called catalyst powder [A] hereinafter.

Note that the diffraction angle for the (111) plane of platinum was measured on catalyst powder [A] by using an X-ray diffractometer. As a consequence, it was possible to confirm, from the shift amount, that platinum was alloyed with iron.

Preparation of Catalyst Powder [B]

Supported catalysts 5 were prepared by the following method.

That is, following the same procedures as described above in relation to catalyst powder [A], supported catalysts 5 having a supported platinum content of 61.2 wt % and a supported iron content of 4.1 wt % was obtained. The supported catalysts 5 thus obtained will be called catalyst powder [B] hereinafter.

Note that the diffraction angle for the (111) plane of platinum was also measured on catalyst powder [B] by using an X-ray diffractometer. As a consequence, it was possible to confirm, from the shift amount, that platinum was alloyed with iron.

Preparation of Catalyst Powder [C]

Supported catalysts were prepared by the following method.

First, 3.5 g of the same carbon black powder as used in the manufacture of catalyst powder [A] was dispersed in 0.2 L of pure water. Then, a hexahydroxo platinate nitrate solution containing 6.0 g of platinum was dropped in this dispersion. In addition, 1 L of pure water was dropped, and the dispersion was filtered.

Then, the filter cake was washed and redispersed in 1 L of pure water. Subsequently, an aqueous iron chloride solution containing 0.5 g of iron was added to this dispersion. In addition, 1N aqueous ammonia solution was slowly dropped in the dispersion. In this manner, the iron hydroxide was supported by the carbon supports.

The dispersion was then filtered, and the filter cake was washed and dried in a vacuum. After that, the dried filter cake was reduced in a hydrogen atmosphere at 500° C. for 2 hours. Subsequently, the reduced material was heated in an argon atmosphere at 800° C. for 6 hours to produce an alloy of platinum and iron.

In addition, the carbon supports supporting the alloy of platinum and iron were washed with 1N aqueous sulfuric acid solution to remove an unalloyed component. Subsequently, the dispersion was filtered, and the filter cake was washed and dried.

In this manner, supported catalysts having a supported platinum content of 61.2 wt % and a supported iron content of 4.0 wt % was obtained. The supported catalysts thus obtained will be called catalyst powder [C] hereinafter.

Note that the diffraction angle for the (111) plane of platinum was also measured on catalyst powder [C] by using an X-ray diffractometer. As a consequence, it was possible to confirm, from the shift amount, that platinum was alloyed with iron.

Measurements of Physical Properties of Catalyst Powders

The transition metal elution ratio $R_T$ and eluted transition metal concentration $C_T$ of each of catalyst powders [A] to [C] were checked. The results are summarized in Tables 1 and 2 below and in FIGS. 2 and 3.

TABLE 1

| | Catalyst powder | | |
|---|---|---|---|
| | [A] | [B] | [C] |
| Supported Pt content (wt %) | 61.1 | 61.1 | 61.1 |
| Supported Fe content (Wt %) | 4.1 | 4.0 | 4.1 |
| Fe/Pt (molar ratio) | 0.2 | 0.2 | 0.2 |
| Eluted transition metal concentration $C_{800}$ (ppm) | 80 | 84 | 340 |
| Elution ratio $R_{800}$ (%) | 11.8 | 12.6 | 49.8 |

TABLE 2

| Duration of stirring T (hours) | Eluted transition metal concentration $C_T$ (ppm) | | |
|---|---|---|---|
| | Catalyst powder [A] | Catalyst powder [B] | Catalyst powder [C] |
| 1 | 1 | 4 | 60 |
| 10 | 40 | 44 | 200 |
| 50 | 56 | 60 | 260 |
| 100 | 62 | 62 | 280 |
| 200 | 64 | 64 | 306 |
| 300 | 70 | 66 | 322 |
| 400 | 74 | 76 | 330 |
| 800 | 80 | 84 | 340 |

Figure 2:
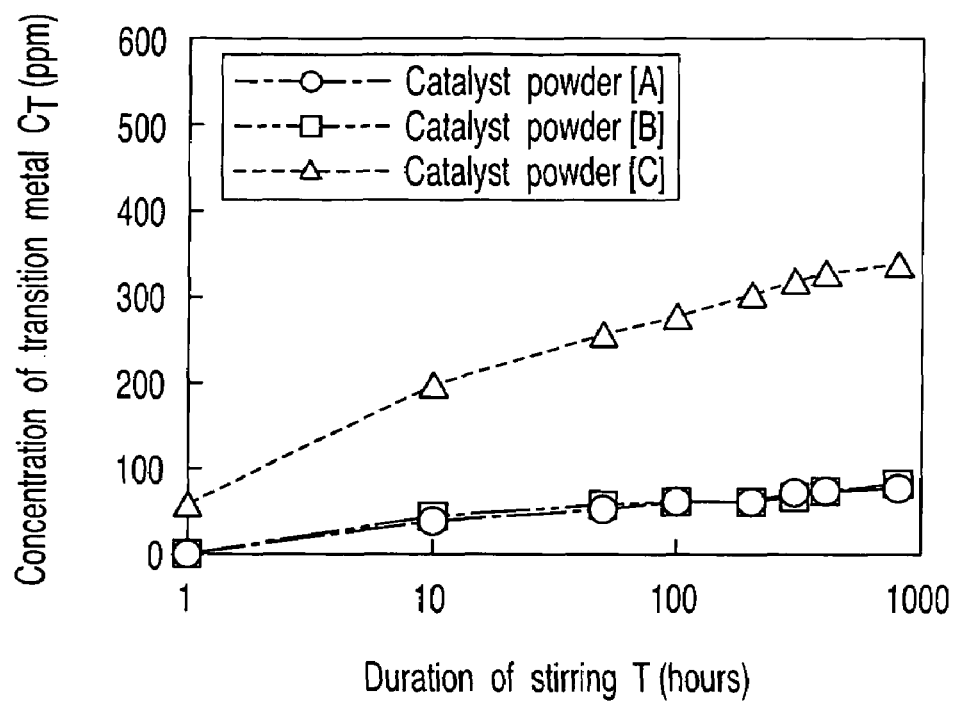
FIG. 2 is a graph showing the relationship between the duration of stirring and the transition metal concentration.
Figure 3:
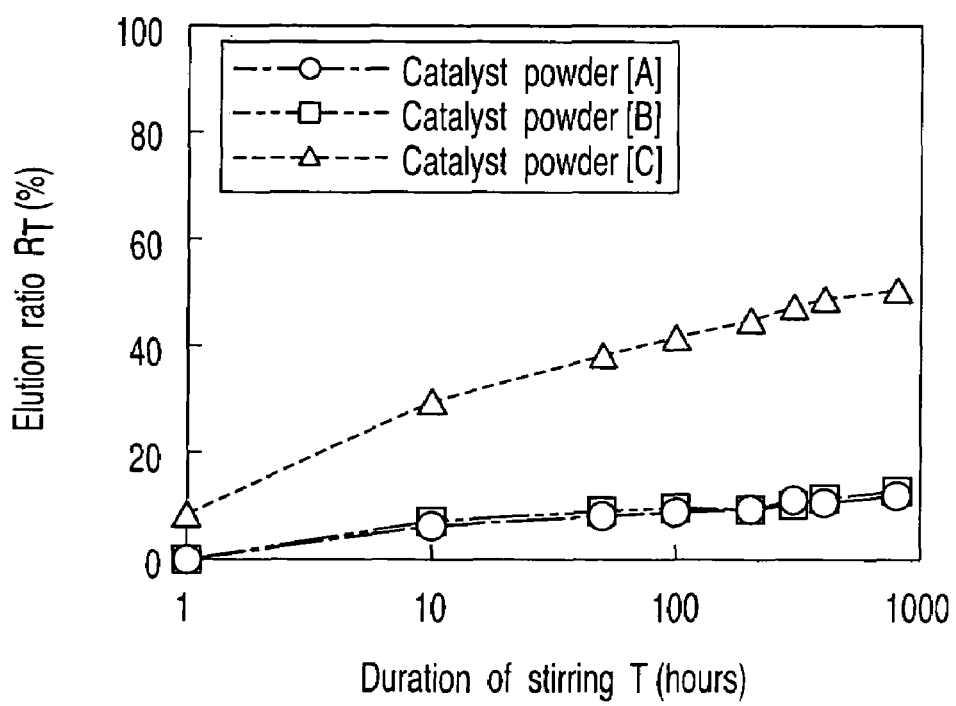
FIG. 3 is a graph showing the relationship between the duration of stirring and the transition metal elution ratio.

FIG. 2 is a graph showing the relationship between the duration of stirring T and the transition metal concentration $C_T$. Referring to FIG. 2, the abscissa indicates the duration of stirring T, and the ordinate indicates the transition metal concentration $C_T$. Also, FIG. 3 is a graph showing the relationship between the duration of stirring T and the transition metal elution ratio $R_T$. Referring to FIG. 3, the abscissa indicates the duration of stirring T, and the ordinate indicates the transition metal elution ratio $R_T$.

As shown in Tables 1 and 2 and FIGS. 2 and 3, the elution of the iron ion was suppressed in catalyst powders ∂A] and [B] when compared to catalyst powder [C].

Manufacture of Single Cell Electrodes [A] to [C]

A membrane electrode assembly 1 shown in FIG. 1 was manufactured by the following method.

First, supported catalysts including carbon supports and platinum supported thereby and having a supported platinum content of 30 wt % were added to an organic solvent, and uniformly dispersed in the organic solvent by an ultrasonic homogenizer. Then, a Teflon sheet was coated with this dispersion, and the coating film was dried, thereby obtaining an anode catalyst layer 2 having a catalyst coating amount of 0.3 mg per 1 cm$^2$ of the electrode area. The anode catalyst layer 2 will be called catalyst layer [D] hereinafter.

Catalyst layers [A] to [C] were manufactured by the following methods.

First, catalyst powder [A] was added to an organic solvent, and uniformly dispersed in the organic solvent by an ultrasonic homogenizer. Then, a Teflon sheet was coated with this dispersion, and the coating film was dried, thereby obtaining a cathode catalyst layer 3 having a catalyst coating amount of 0.4 mg per 1 cm$^2$ of the electrode area. The cathode catalyst layer 3 will be called catalyst layer [A] hereinafter.

A cathode catalyst layer 3 was obtained following the same procedure as described above in relation to catalyst layer [A], except that catalyst powder [B] was used. In addition, a cathode catalyst layer 3 was obtained following the same procedure as described above in relation to catalyst layer [A], except that catalyst powder [C] was used. The cathode catalyst layers 3 will be called catalyst layers [B] and [C], respectively, hereinafter.

Then, each of catalyst layers [A] to [C] and catalyst layer [D] were laminated one on the other via a proton conductive solid electrolyte layer 4 by a hot press. In this way, three types of membrane electrode assemblies 1 were manufactured, and diffusion layers were formed on the two surfaces of each assembly. The single cell electrodes obtained as described above will be called single cell electrodes [A] to [C] hereinafter.

Evaluation of single cell electrodes [A] to [C]

The characteristics of single cell electrodes [A] to [C] described above were evaluated by the following methods.

That is, single cell electrodes [A] to [C] were caused to generate power by supplying air at a flow rate of 1.0 L/min from the side of the cathode catalyst layer 3, and hydrogen at a flow rate of 0.5 L/min from the side of the anode catalyst layer 2. In this case, the bubbler temperature on the side of the cathode catalyst layer 3 was set at 85° C., and the bubbler temperature on the side of the anode catalyst layer 2 was set at 75° C. Also, the temperature of single cell electrodes [A] to [C] was maintained at 80° C. While the output current density of single cell electrodes [A] to [C] was maintained at 0.5 A/cm$^2$, changes in output voltage with time were checked. The results are summarized in Table 3 below and in FIG. 4.

TABLE 3

| Duration of power generation (hours) | Cell voltage @0.5 A/cm$^2$(V) | | |
|---|---|---|---|
| | Single cell electrode [A] | Single cell electrode [B] | Single cell electrode [C] |
| 1 | 0.775 | 0.775 | 0.775 |
| 10 | 0.774 | 0.773 | 0.770 |
| 50 | 0.775 | 0.776 | 0.764 |
| 100 | 0.773 | 0.772 | 0.760 |
| 200 | 0.776 | 0.775 | 0.750 |
| 300 | 0.775 | 0.773 | 0.743 |
| 400 | 0.772 | 0.771 | 0.739 |
| 800 | 0.775 | 0.775 | 0.715 |

FIG. 4 is a graph showing the changes in output voltage with time. Referring to FIG. 4, the abscissa indicates the time elapsed from the start of power generation, and the ordinate indicates the cell voltages of single cell electrodes [A] to [C]. As shown in Table 3 and FIG. 4, the cell voltage of single cell electrode [C] significantly lowered with the passing of time, and lowered to 0.770V when 10 hours elapsed from the start of power generation. In contrast, single cell electrodes [A] and [B] had cell voltages of 0.770V or more even when 800 hours elapsed from the start of power generation, and maintained high cell voltages for long time periods.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A supported catalyst for a fuel cell, comprising:
   a conductive support; and
   a platinum alloy supported by the conductive support, the platinum alloy comprising platinum and at least one transition metal other than platinum;
   wherein the at least one transition metal other than platinum is such that an elution ratio of the transition metal other than platinum is 30% or less when 0.5 g of the supported catalyst is stirred at room temperature in 30 mL of 0.1N aqueous sulfuric acid solution for 800 hours.

2. The supported catalyst according to claim 1 wherein the at least one transition metal other than platinum is such that when 0.5 g of the supported catalyst is stirred at room temperature in 30 mL of 0.1N aqueous sulfuric acid solution for 800 hours, a concentration of the transitional metal other than platinum in the aqueous solution after stirring is 200 ppm or less.

3. The supported catalyst according to claim 1, wherein the platinum alloy contains at least one element selected from the group consisting of iron, cobalt, nickel, copper, and manganese.

4. The supported catalyst according to claim 1, wherein the platinum alloy is binary alloy.

5. The supported catalyst according to claim 1, wherein a molar ratio of transition metal other than platinum with respect to platinum in the platinum alloy is 0.15 or more.

6. The supported catalyst according to claim 1, wherein the average particle diameter of the platinum alloy falls within a range from 1 to 5 nm.

7. The supported catalyst according to claim 1, wherein a supported platinum content of the supported catalyst falls within a range from 5 to 80% by weight.

8. The supported catalyst according to claim 1, wherein the conductive support is a carbon support.

9. A fuel cell comprising:
   an anode catalyst layer;
   a cathode catalyst layer; and
   an electrolyte layer interposed therebetween,
   wherein at least one of the anode and cathode catalyst layers contains the supported catalyst according to any one of claims 1 to 8.

10. The fuel cell according to claim 9, wherein the electrolyte layer is a proton conductive solid electrolyte layer.

11. A method of manufacturing a supported catalyst for a fuel cell, comprising:
   causing a particulate conductive support to support a platinum compound;
   applying a reducer to the platinum compound to metallize the platinum compound by adding the reducer to a dispersion containing a deionized water and the particulate conductive support supporting the platinum compound;
   after metallizing the platinum compound, causing the conductive support to further support a transition metal other than platinum by wet process under reducing condition using hydrazine as a reducer;
   producing an alloy of the platinum and the transition metal other than platinum by heating the conductive support supporting the transition metal other than platinum to obtain a supported catalyst comprising the conductive support and the alloy supported thereby; and
   acid washing the supported catalyst to remove an unalloyed component of the transition metal other than platinum from the supported catalyst.

* * * * *